(12) United States Patent
Shen et al.

(10) Patent No.: US 10,606,882 B2
(45) Date of Patent: Mar. 31, 2020

(54) BODY INFORMATION ANALYSIS APPARATUS AND METHOD OF ESTIMATING REMAINING CAPACITY OF COSMETIC PRODUCT THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Ching-Sheng Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 246 days.

(21) Appl. No.: 15/789,604

(22) Filed: Oct. 20, 2017

(65) Prior Publication Data

US 2019/0065531 A1 Feb. 28, 2019

(30) Foreign Application Priority Data

Aug. 29, 2017 (CN) .......................... 2017 1 0756229

(51) Int. Cl.
| | |
|---|---|
| *G06F 16/532* | (2019.01) |
| *G09B 5/02* | (2006.01) |
| *G09B 5/04* | (2006.01) |
| *G09B 19/00* | (2006.01) |
| *A45D 44/00* | (2006.01) |

(Continued)

(52) U.S. Cl.
CPC .......... *G06F 16/532* (2019.01); *A45D 44/00* (2013.01); *G06Q 10/087* (2013.01); *G09B 5/02* (2013.01); *G09B 5/04* (2013.01); *G09B 5/065* (2013.01); *G09B 19/00* (2013.01); *G04F 10/00* (2013.01); *G06F 3/147* (2013.01)

(58) Field of Classification Search
CPC . G06F 16/532; G06F 17/30277; A45D 44/00; G06Q 10/087; G06Q 10/078; G09B 19/00; G09B 5/02; G09B 5/04; G09B 5/065
See application file for complete search history.

(56) References Cited

U.S. PATENT DOCUMENTS

| | | | |
|---|---|---|---|
| 9,838,508 B2 * | 12/2017 | Salem | ................. G06F 19/3418 |
| 2015/0178654 A1 | 6/2015 | Glasgow et al. | |
| 2016/0080527 A1 | 3/2016 | Salem | |

FOREIGN PATENT DOCUMENTS

| | | |
|---|---|---|
| WO | WO 2012/053891 A1 | 4/2012 |
| WO | WO 2016/196140 A1 | 12/2016 |

* cited by examiner

*Primary Examiner* — Bryan Bui
(74) *Attorney, Agent, or Firm* — Muncy, Geissler, Olds & Lowe, P.C.

(57) ABSTRACT

A body information analysis apparatus (10) and method of estimating remaining capacity of cosmetic product thereof are disclosed. The method includes following steps of: controlling a body information analysis apparatus (10) to configure a plurality of cosmetic product data respectively corresponding to different cosmetic products; updating an remaining capacity of each cosmetic product data according to a use record of the body information analysis apparatus (10) and a reference consumption amount of each cosmetic product data; sending a reminder message when the remaining capacity of any of the plurality of cosmetic product data is less than a safety capacity; and, retrieving feedback data corresponding to the cosmetic product data and updating the remaining capacity of the cosmetic product data according to the feedback data.

11 Claims, 9 Drawing Sheets

(51) Int. Cl.
*G09B 5/06* (2006.01)
*G06Q 10/08* (2012.01)
*G06F 3/147* (2006.01)
*G04F 10/00* (2006.01)

BODY INFORMATION ANALYSIS APPARATUS AND METHOD OF ESTIMATING REMAINING CAPACITY OF COSMETIC PRODUCT THEREOF

BACKGROUND OF THE INVENTION

Technical Field

The present disclosure relates to cosmetic product, especially to a method of estimating remaining capacity of cosmetic product.

Description of Related Art

From ancient time, people usually paid much attention on beauty care. Various cosmetic products are developed and put to market as the progress of chemical engineering technique. Moreover, people tend to maximize the effect of cosmetic product by alternatively using various kinds of cosmetic products instead of using single cosmetic product.

Taking face mask as example, people may buy various kinds of face masks (such as cleaning face mask, restoration face mask, moisture face mask or firming face mask) and uses a specific face mask according to specific need. For example, people may use firming face mask before sleep, use restoration face after sun baking, use moisture face mask for dry weather and use cleaning face mask after outdoor activities.

Taking lipstick as example, people may buy lipsticks of different colors and use the lipstick with desired color according to her mood or the situations.

However, it is difficult for people to memorize the remaining capacity for all cosmetic products as the kinds and amounts of the purchased cosmetic products increase. The cosmetic product may be found to be exhausted and the cosmetic plan is interrupted when people want to use the cosmetic product.

SUMMARY OF THE INVENTION

The disclosure is directed to provide a method of estimating remaining capacity of cosmetic product to automatically estimate the remaining capacity of cosmetic product without needing actual measurement. Therefore, user can be reminded to purchase backup cosmetic product before the cosmetic product is exhausted.

According to one of exemplary embodiments, the present disclosure provides a method of estimating remaining capacity of cosmetic product, the method comprising: a) using a body information analysis apparatus to receive a cosmetic product configuration operation to configure a plurality of cosmetic product data and configure a remaining capacity for each of the cosmetic product data, wherein each of the cosmetic product data is corresponding to a cosmetic product; b) adjusting the remaining capacity for each of the cosmetic product data based on a usage record of the body information analysis apparatus and a reference consumption amount of the cosmetic product data; c) sending a reminder message when the remaining capacity of any of the cosmetic product data is less than a safety capacity; d) receiving a feedback operation to configure a feedback data for any of the cosmetic product data; and e) modifying the remaining capacity of the cosmetic product data based on the feedback data for the cosmetic product.

According to another one of exemplary embodiments, the present disclosure provides a body information analysis apparatus, comprising: a display module configured to display a reminder message; an input module configured to receive a cosmetic product configuration operation and to receive a feedback operation when the reminder message is displayed; a memory module configured to store a plurality of cosmetic product data, a safety capacity, a remaining capacity and a reference consumption amount for each of the cosmetic product data, and configured to store a usage record of the body information analysis apparatus, wherein each of the cosmetic product data is corresponding to a cosmetic product; and a control module electrically connected to the display module, the input module and the memory module and comprising: a configuring module configured to set up a plurality of cosmetic product data based on the cosmetic product configuration operation and set up the remaining capacity of the cosmetic product data; an updating module configured to adjust the remaining capacity of the cosmetic product data based on usage record and the reference consumption amount of each cosmetic product data; a monitoring module configured to send the reminder message through the display module when determining that the remaining capacity of any of the cosmetic product data is less than the safety capacity; and a feedback module configured to set up a feedback data for the cosmetic product data based on the feedback operation and modify the remaining capacity of the cosmetic product data based on the feedback data.

The present disclosure automatically estimates the remaining capacity of cosmetic product based on usage record of a body information analysis apparatus, and reminds the user before the cosmetic product is exhausted, thus prevent the interrupt of cosmetic plan due to the exhaustion of cosmetic product.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE DISCLOSURE

Figure 1A:
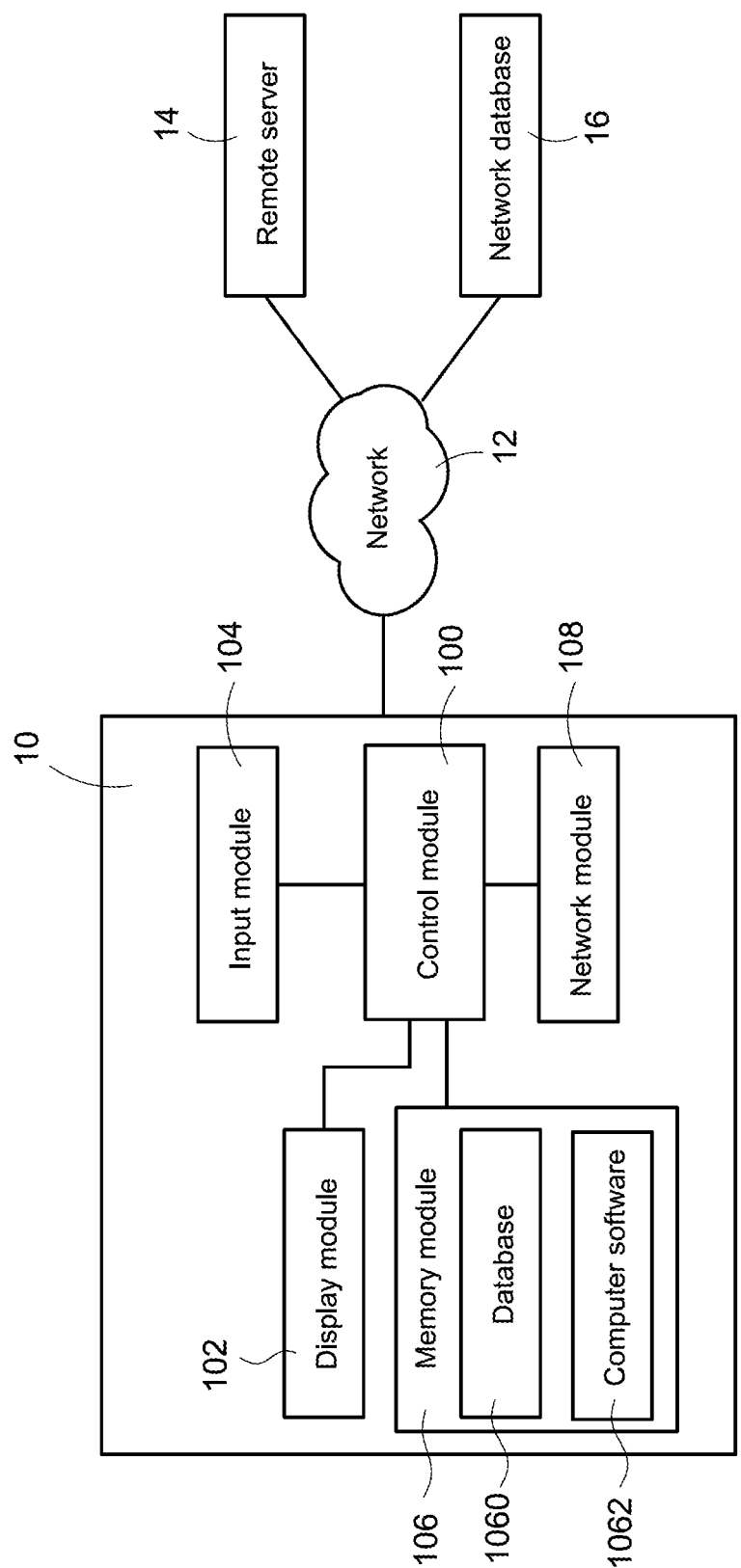
FIG. 1A shows a schematic view for the body information analysis system according to the first embodiment of the present disclosure.

FIG. 1A shows a schematic view for the body information analysis system according to the first embodiment of the present disclosure. The present disclosure discloses a body information analysis apparatus 10, which automatically estimate the remaining capacity of cosmetic product without needing to perform actual measurement and automatically reminds user to purchase backup cosmetic product before the cosmetic product is exhausted.

The body information analysis apparatus 10 (such as electronic mirror) mainly comprises a control module 100, a display module 102, an input module 104 and a memory module 106.

The display module 102 (such as liquid crystal display or touch panel) displays information based on the control of the control module 100.

The input module 104 (such as microphone, image fetcher, physical key or touch key) receives user operation and converts the user operation into corresponding user input data.

The memory module 106 is used to store data. In one embodiment, the memory module 106 comprises database 1060 storing a plurality of cosmetic product information and related information (such as product number, name, expiry date, product appearance image and so on) for the cosmetic product. Each of the cosmetic product information is corresponding to a physical cosmetic product.

According to one embodiment, the memory module 106 further stores cosmetic cabinet dataset for each user. Each user may operate the input module 104 to search, in the database 1060, for one or more cosmetic product data of one or more cosmetic product actually owned by the user and add the cosmetic product data into the cosmetic cabinet dataset. By setting up the cosmetic cabinet dataset, user can conveniently browser or manage a plurality of cosmetic product data corresponding to a plurality of cosmetic products.

The control module 100 (such as micro controller unit (MCU) or central processing unit (CPU)) is electrically connected to the display module 102, the input module 104 and the memory module 106 to perform control thereof.

According to one embodiment, the body information analysis apparatus 10 has networking function. More particularly, the body information analysis apparatus 10 further comprises network module 108 (such as Ethernet module, Wi-Fi module or mobile communication module) electrically connected to the control module 100. The network module 108 is connected to network 12 (such as Internet) and connected to a remote server 14 through the network 12 (such as sending the usage record of the body information analysis apparatus 10 to the remote server 14, or downloading the updated data or updated software from the remote server 14) or connected to a network database 16 for sending/receiving data.

According to one embodiment, the cosmetic product data is stored in the network database 16. The body information analysis apparatus 10 is connected to the network database 16 through the network module 108 and the network 12 and searches for the specific cosmetic product data in the network database 16. In this embodiment, the memory module 106 does not need database 1060 and the storage space of the memory module 106 can be saved.

Figure 1B:
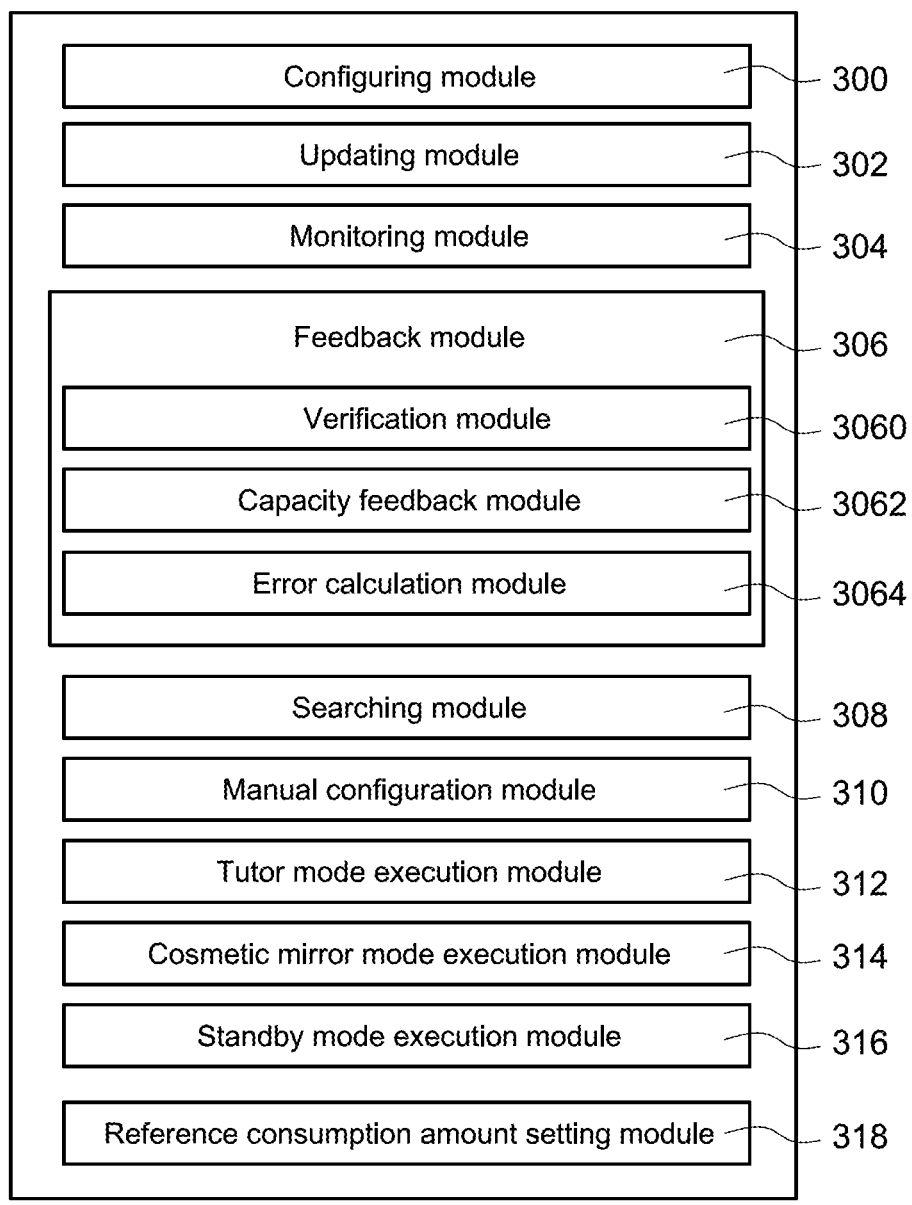
FIG. 1B shows the architecture of the control module of the present disclosure.

With reference also to FIG. 1B, this figure shows the architecture of the control module of the present disclosure. More particularly, the memory module 106 comprises non-transitory computer-readable medium and stores computer software 1062 such as application program or operation system. The computer software 1062 stores computer executable program codes. The control module 100 mainly realizes the function of the method of estimating remaining capacity of cosmetic products of the present disclosure on by executing the above-mentioned computer executable program codes. Based on the functionality thereof, the above-mentioned computer executable program codes can be classified as following functional modules.

1. Configuring module 300, used to configure a plurality of cosmetic product data based on the cosmetic product configuration operation and configure the remaining capacity of the cosmetic product data.

In one embodiment, the configuring module 300 adds the plurality of cosmetic product data corresponding to the plurality of cosmetic product owned by the user into the cosmetic cabinet dataset and configures the initial capacity of the cosmetic product data as the remaining capacity of the cosmetic product data.

2. Updating module 302, used to adjust the remaining capacity of the cosmetic product data based on usage record of the body information analysis apparatus 10 and reference consumption amount of each cosmetic product data.

In one embodiment, the updating module 302 adjusts the remaining capacity of the cosmetic product data based on the usage record of the body information analysis apparatus 10, the reference consumption amount of each cosmetic product data, and the habitual usage frequency.

3. Monitoring module 304, used to send reminder message through the display module 102 when determining that the remaining capacity of any of the cosmetic product data is less than a safety capacity.

4. Feedback module 306, used to feedback data for the cosmetic product data based on the feedback operation and modify the remaining capacity of the cosmetic product data based on the feedback data.

According to one embodiment, the feedback module 306 may comprise a verification module 3060, a capacity feedback module 3062 and an error calculation module 3064. The verification module 3060 receives verification feedback operation through the input module 104 and sets verification feedback data based on the verification feedback operation. The capacity feedback module 3062 receives capacity feedback operation through the input module 104 and set capacity feedback data based on the capacity feedback operation when verification feedback data indicates that capacity is excessively few. The error calculation module 3064 calculates the capacity error based on the capacity feedback data and the remaining capacity of the cosmetic product data, modifies the remaining capacity of the cosmetic product based on the capacity feedback data of the cosmetic product, and modifies the reference consumption amount based on the capacity error.

In one embodiment, the verification feedback data indicates whether the actual capacity of the corresponding cosmetic product is excessively few and the capacity feedback data indicates the actual capacity of the corresponding cosmetic product.

5. Searching module 308, used to search for the cosmetic product data corresponding to the image of the photo-taken cosmetic product.

6. Manual configuration module 310, used to receive cosmetic product establish operation through the input module 104 when the searching module 308 fails in searching and sets up new cosmetic product data based on the cosmetic product establish operation.

7. Tutor mode execution module 312, used to receive content selection operation through the input module 104 and playback the selected tutor content data by the display module 102 after the body information analysis apparatus 10 enters tutor mode. The tutor mode execution module 312 adjusts the remaining capacity in each of the cosmetic product data based on the tutor count or the tutor accumulation time with the tutor reference consumption amount for each cosmetic product data.

In one embodiment, the tutor mode execution module 312 adjusts the remaining capacity in each of the cosmetic product data based on the suggested consumption amount in the cosmetic product data of playbacked tutor content data.

8. Cosmetic mirror mode execution module 314, used to update the cosmetic accumulation count and then starts time counting after the body information analysis apparatus 10 enters cosmetic mirror mode. The cosmetic mirror mode execution module 314 stops time counting when the body information analysis apparatus 10 exits cosmetic mirror mode and then obtains the single usage time. The cosmetic mirror mode execution module 314 updates the cosmetic accumulation time based on the single usage time. The cosmetic mirror mode execution module 314 then adjusts the remaining capacity in each of the cosmetic product data based on the cosmetic reference consumption amount and cosmetic accumulation count (or cosmetic accumulation time).

9. Standby mode execution module 316, used to adjust the remaining capacity in each of the cosmetic product data based on default consumption amount of each cosmetic product data when the continual standby time of the body information analysis apparatus 10 reaches the default standby time.

10. Reference consumption amount setting module 318, used to receive habitual input operation through the input module 104, set up the habitual usage frequency and habitual single usage amount for each cosmetic product data, and set up the reference consumption amount in the cosmetic product data based on habitual single usage amount.

Figure 2A:
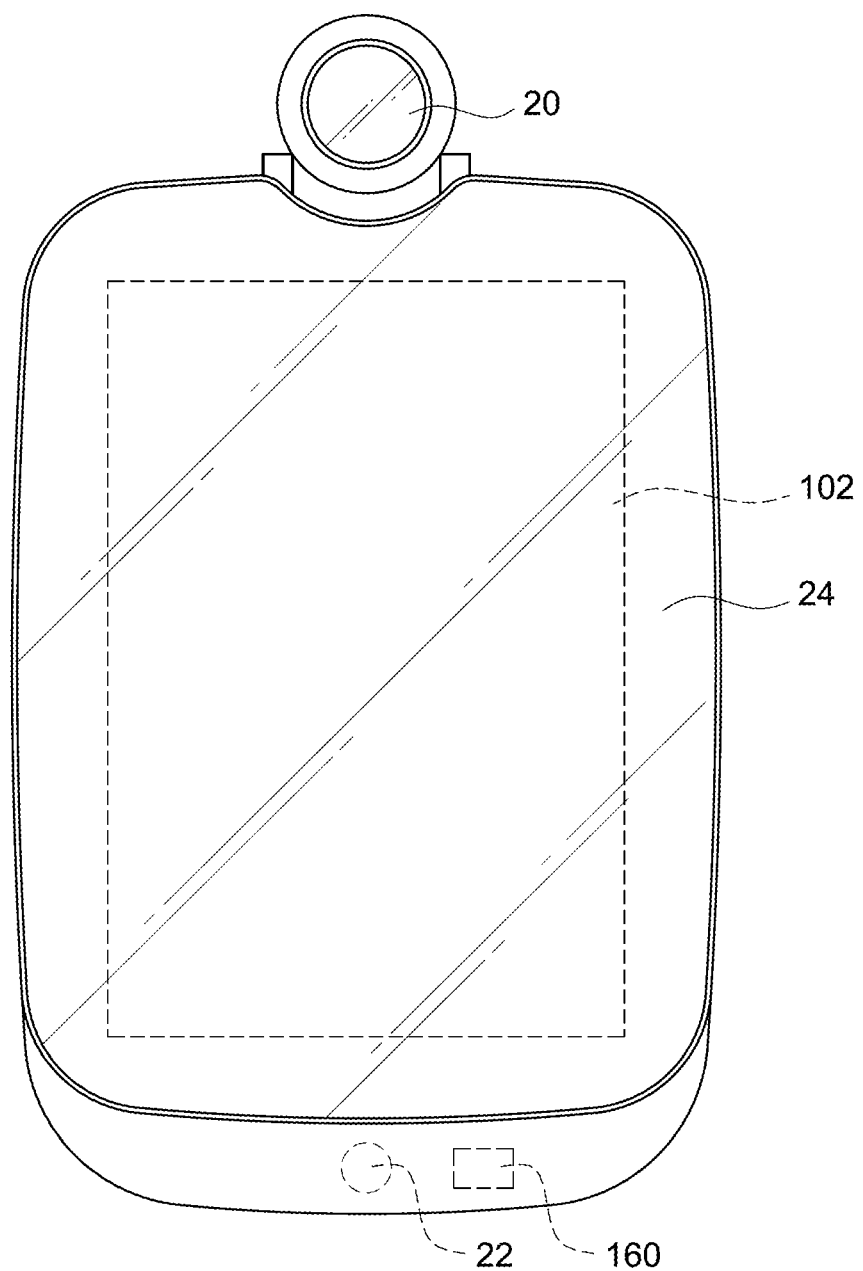
FIG. 2A is a front view of the body information analysis apparatus according to the second embodiment of the present disclosure.
Figure 2B:
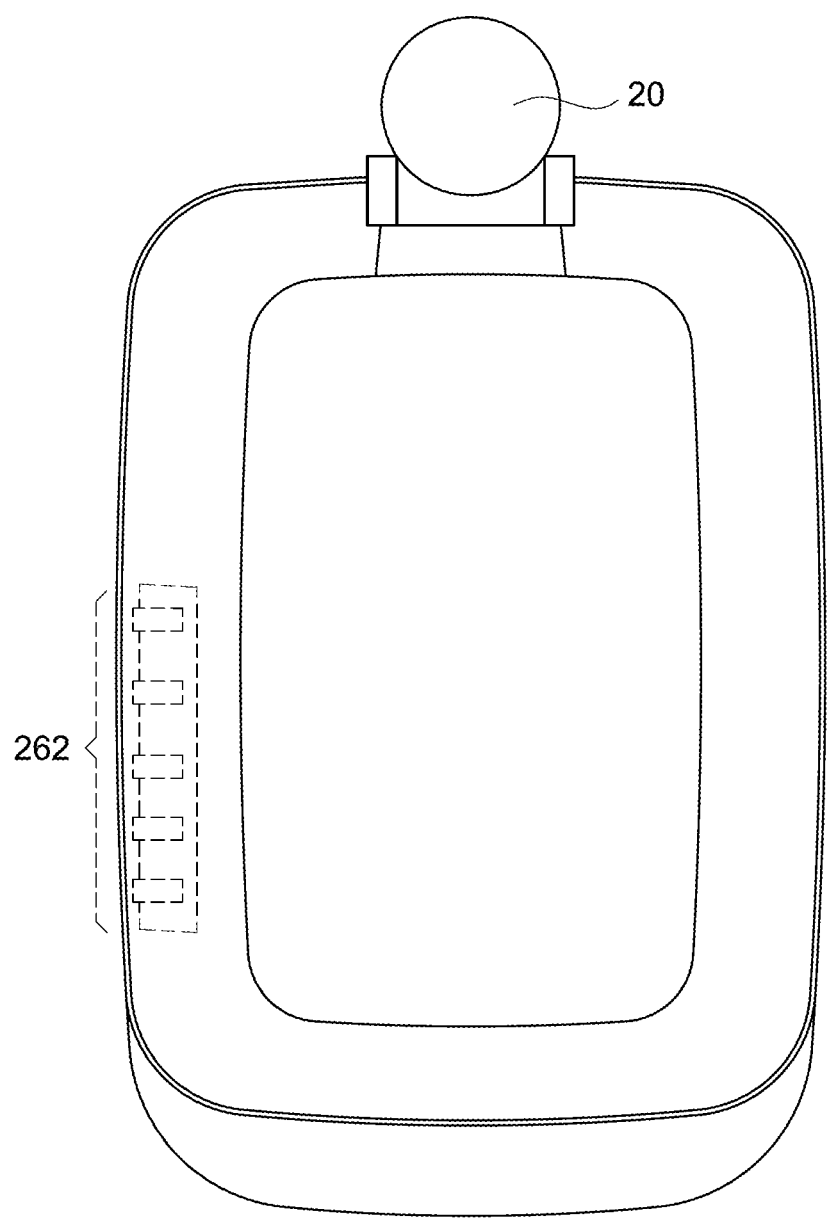
FIG. 2B is a back view of the body information analysis apparatus according to the second embodiment of the present disclosure.

With reference together to FIGS. 1A, 1B, 2A and 2B, FIG. 2A is a front view of the body information analysis apparatus 10 according to the second embodiment of the present disclosure, and FIG. 2B is a back view of the body information analysis apparatus 10 according to the second embodiment of the present disclosure.

In this embodiment, the body information analysis apparatus 10 is an electronic mirror and comprises movement sensor 22 (such as PIR sensor). The input module 104 comprises image fetching unit 20 such as camera.

The image fetching unit 20 is arranged atop the body information analysis apparatus 10 and takes photo of user or the cosmetic product. The movement sensor 22 sends trigger signal to the control module 100 when sensing the approach of user and then the control module 100 wakes up the display module 102 (such as booting or turning on backlight) after receiving the trigger signal. Therefore, the user can directly operate the body information analysis apparatus 10 (without additional operation) when she approaches the body information analysis apparatus 10.

Besides, the input module 104 of the embodiment further comprises microphone 260 and physical key set 262. The microphone 260 is arranged on a front bottom side of the body information analysis apparatus 10 (such as the position of the microphone 260 shown in FIG. 2A). The physical key set 262 is arranged at lateral backside of the body information analysis apparatus 10 (such as the position of the physical key set 262 shown in FIG. 2B). By above mentioned arrangement, the body information analysis apparatus 10 has compact and user-appealing front appearance, and can enhance user experience by the input function of the physical key set 262.

Besides, the body information analysis apparatus 10 further comprises a unidirectional glass 24 arranged on a display face of the display module 102. The light intensity impinged on the front face (corresponding to the location of user) of the unidirectional glass 24 is larger than the light intensity impinged on the back face of the unidirectional glass 24 when the display module 102 is turned off (such as powered off or turning off backlight) such that the unidirectional glass 24 can be used as ordinary reflection mirror and user can view the image thereof on the unidirectional glass 24. The light intensity impinged on the front face of the unidirectional glass 24 is smaller than the light intensity impinged on the back face of the unidirectional glass 24 when the display module 102 is activated (such as powered on or turning on backlight) such that the user can view the display content on the display module 102 and the body information analysis apparatus 10 is functioned as display.

The display module 102 is turned on/off to provide display function or reflection mirror function.

In one embodiment, the display module 102 is partially turned on and partially turned off (for example, the backlight of the upper part is turned on and the backlight of the lower part is turned off) such that the body information analysis apparatus 10 can provide function of both display and reflection mirror.

Figure 3:
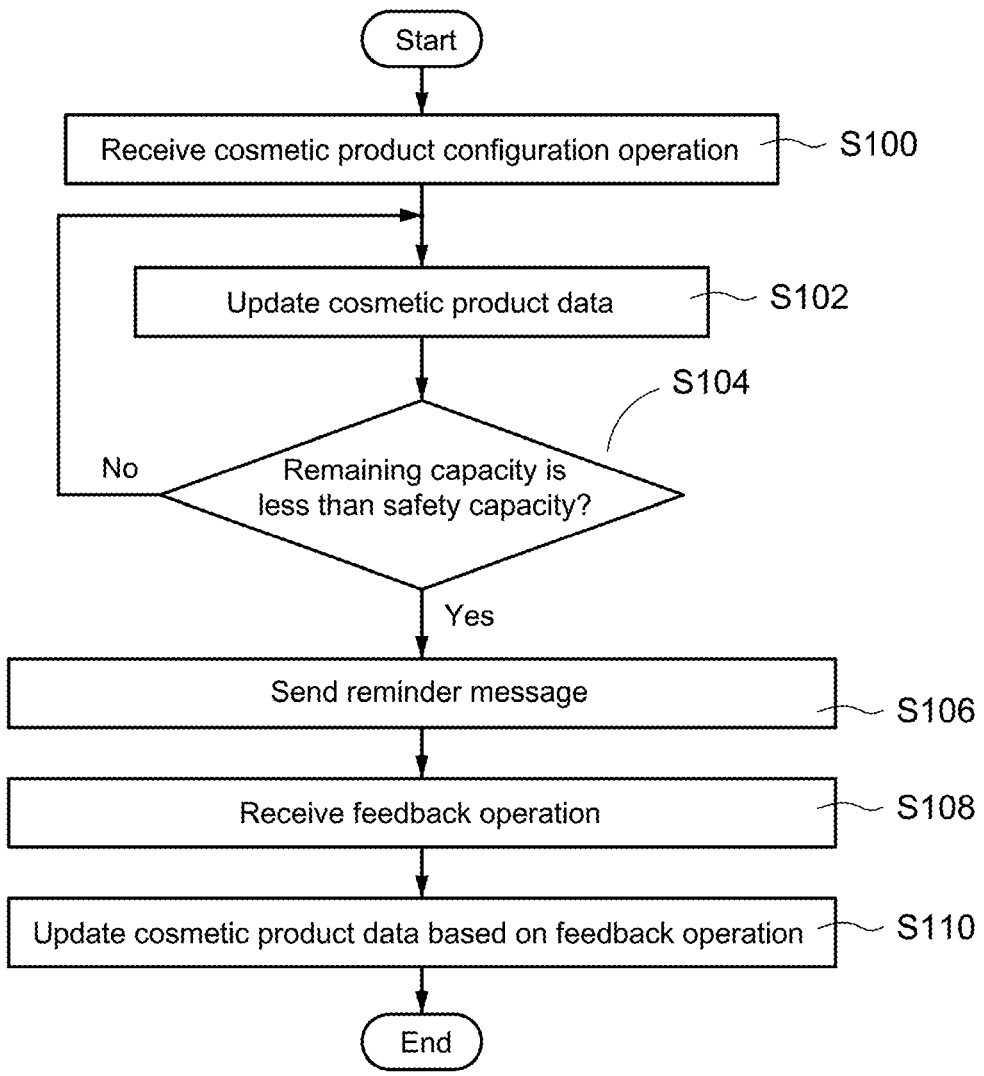
FIG. 3 shows a flowchart of the method of estimating the remaining capacity of the cosmetic product according to the first embodiment of the present disclosure.

FIG. 3 shows a flowchart of the method of estimating the remaining capacity of the cosmetic product according to the first embodiment of the present disclosure. The method of estimating the remaining capacity of the cosmetic product according to various embodiments of the present disclosure can be realized by the body information analysis apparatus 10 shown in FIGS. 1 to 2B. The method of estimating the remaining capacity of the cosmetic product according to the first embodiment of the present disclosure has following steps.

Step S100: the control module 100 receives configuration operation for cosmetic product from user and through the configuration module 300 and the input module 104. The control module 100 sets up one or more cosmetic product data based on the received configuration operation for cosmetic product. Each of the cosmetic product data is corresponding to one cosmetic product owned by the user.

In one embodiment, the control module 100 further configures the remaining capacity in each of the cosmetic product data.

In one embodiment, the control module 100 may recognize the user's identification (for example, using the login id to recognize the current user's identification) and further add the received cosmetic product data into the cosmetic cabinet dataset of the current user.

In one embodiment, the configuration operation for cosmetic product may be input through input module 104 (such as physical key, virtual key or image fetching unit 20) or conducted through sensing the information related to the cosmetic product owned by user (such as barcode, product number, product name or appearance image). Therefore, the control module 100 may search or establish the cosmetic product data for corresponding cosmetic product based on above information.

In one embodiment, the input module 104 may further comprises near field communication (NFC) module. The configuration operation for cosmetic product may be conducted by bringing the tag of the cosmetic product close to the input module 104 to input the information related to the cosmetic product wirelessly. Therefore, the control module 100 may search or establish the cosmetic product data for corresponding cosmetic product based on above information.

Step S102: the control module 100 fetches the usage record of the body information analysis apparatus 10 through the updating module 302 (such as the accumulation counts of entering the non-standby mode from standby mode, the accumulation counts of entering the standby mode, the continuous standby time for each stay in standby mode, the accumulation counts of entering tutor mode, the accumulation counts of entering cosmetic mirror mode, and the accumulation time for each stay in cosmetic mirror mode, and then obtains the reference consumption amount for each cosmetic product.

Afterward, the control module 100 adjusts the remaining capacity of the cosmetic product data based on usage record of the body information analysis apparatus 10 and reference consumption amount of each cosmetic product data.

In one embodiment, the control module 100 reads the current cosmetic cabinet dataset and updates each cosmetic product data in the read cosmetic cabinet dataset.

More particularly, the body information analysis apparatus 10 may be alternately used by a plurality of users. Each user may establish dedicated cosmetic cabinet dataset, where each cosmetic cabinet dataset comprises a plurality of cosmetic product data of cosmetic products for each user.

In other words, different users may buy the cosmetic product of the same product number. The cosmetic cabinet datasets for different users may include cosmetic product data of cosmetic products with the same product number (but with different remaining capacity). By updating the cosmetic cabinet dataset for current user, the erroneous updating of the cosmetic product data of cosmetic products owned by other user can be avoided.

Step S104: the control module 100 determines, through the monitoring module 304, whether the remaining capacity of any adjusted cosmetic product data is lowered than a safety capacity of the cosmetic product data.

In one embodiment, the safety capacity of each cosmetic product data is preset based on the type of the cosmetic product corresponding to the cosmetic product data and stored in the memory module 106.

In one embodiment, the control module 100 determines whether the remaining capacity of any cosmetic product data in the cosmetic cabinet dataset of current user is lowered than the safety capacity of the cosmetic product data.

The control module 100 executes step S106 if the remaining capacity of any adjusted cosmetic product data is lowered than the safety capacity of the cosmetic product data. Otherwise, the control module 100 re-executes step S102 to continually obtain the new usage record of the body information analysis apparatus 10 and to continually adjust the remaining capacity of each cosmetic product data.

Step S106: the control module 100 sends a reminder message through the monitoring module 304. In one embodiment, the control module 100 may control the display module 102 to display the above-mentioned reminder message (such as textual message or graphic message), control the loudspeaker (not shown) of the body information analysis apparatus 10 to play back the above-mentioned reminder message (such as voice message), control the indication lamp (not shown) of the body information analysis apparatus 10 to send the above-mentioned reminder message (such as flashing the indication lamp, or forward the above-mentioned reminder message to user's mobile device trough the network module 108 or the network 12.

The present disclosure further provides a feedback modification function, which automatically adjusts the remaining capacity in the cosmetic product data by the feedback operation of user, thus enhancing the preciseness of the remaining capacity. The feedback modification function comprises following steps.

Step S108: the control module 100 receives, through the input module 104 and the feedback module 306, the feedback operation of user to set up the feedback information of cosmetic product data.

In one embodiment, the control module 100 may display questionnaire through the display module 102 with one or more question to evaluate the remaining capacity. For example, the question may be "whether the cosmetic product will be exhausted?", "what is the actual capacity of the cosmetic product?", and "what is the consumption amount for this time?" and so on. The user may answer the above questions through operating the input module 102 and the control module 100 uses the user input data as the above-mentioned feedback data.

In one embodiment, the user may answer the question with natural language and does not need to input the rigid numeral. For example, the use may give the answer "very sufficient", "sufficient", "almost exhausted", or "already exhausted" when answering the question "what is the actual capacity of the cosmetic product?" asked by the control module 100 and does not need to answer the actual capacity (such as 30 ml). Step S110: the control module 100 updates the cosmetic product data through the feedback module 306 based on the feedback data.

In one embodiment, the control module 100 modifies the remaining capacity of the cosmetic product data in the cosmetic cabinet dataset of the current user based on the feedback.

For example, the control module 100 may execute the step S102 to determine that the remaining capacity of the cosmetic product is only 10 ml based on the cosmetic product data. When the feedback data of user is "very sufficient", the control module 100 may increase the remaining capacity of the cosmetic product to 50 ml. The control module 100 may set the remaining capacity of the cosmetic product to 0 ml when the feedback data of user is "already exhausted".

In one embodiment, the control module 100 further calculates a difference between the remaining capacity of the cosmetic product data before modification and after modification, and modifies the reference consumption amount based on the calculated difference.

The present disclosure may effectively perform feedback modification function to enhance the accuracy of estimating the remaining capacity.

It should be noted that the feedback modification function may be automatically triggered for each reminder, or triggered with predetermined frequency (such as once a week), or manually triggered by user.

It should be noted that in the present disclosure, the reminder message can be sent when the remaining capacity of the cosmetic product data is lower than the corresponding safety capacity.

In another embodiment, the control module 100 may determine whether any cosmetic product data has passed the expiry date thereof and sends the reminder message when the expiry date passes. The present disclosure can prevent user from carelessly using the expired cosmetic product. In this embodiment, the cosmetic product data may contain the expiry date (such as 1 year from the manufacture date). The control module 100 may determine whether any cosmetic product data has passed the expiry date thereof by referring to the set time of the cosmetic product or the user-input manufacture date, the current date and the expiry date.

In one embodiment, the control module 100 may estimate the expected exhaustion date (such as 10 days) of the cosmetic product based on the remaining capacity in the cosmetic product data, the habitual use frequency of user (of default use frequency) and the reference consumption amount. The control module 100 may estimate the reminder date (such as Jun. 10, 2017) based on the expiry date (such as Jun. 20, 2017) in the cosmetic product data and the expected exhaustion date and sends the reminder message in advance at the reminder date. Therefore, the present disclosure may send reminder message before the expiry date of a cosmetic product to render the user with enough time to dispose of the cosmetic product (such as begin to use the cosmetic product or give the cosmetic product to other people).

Figure 4:
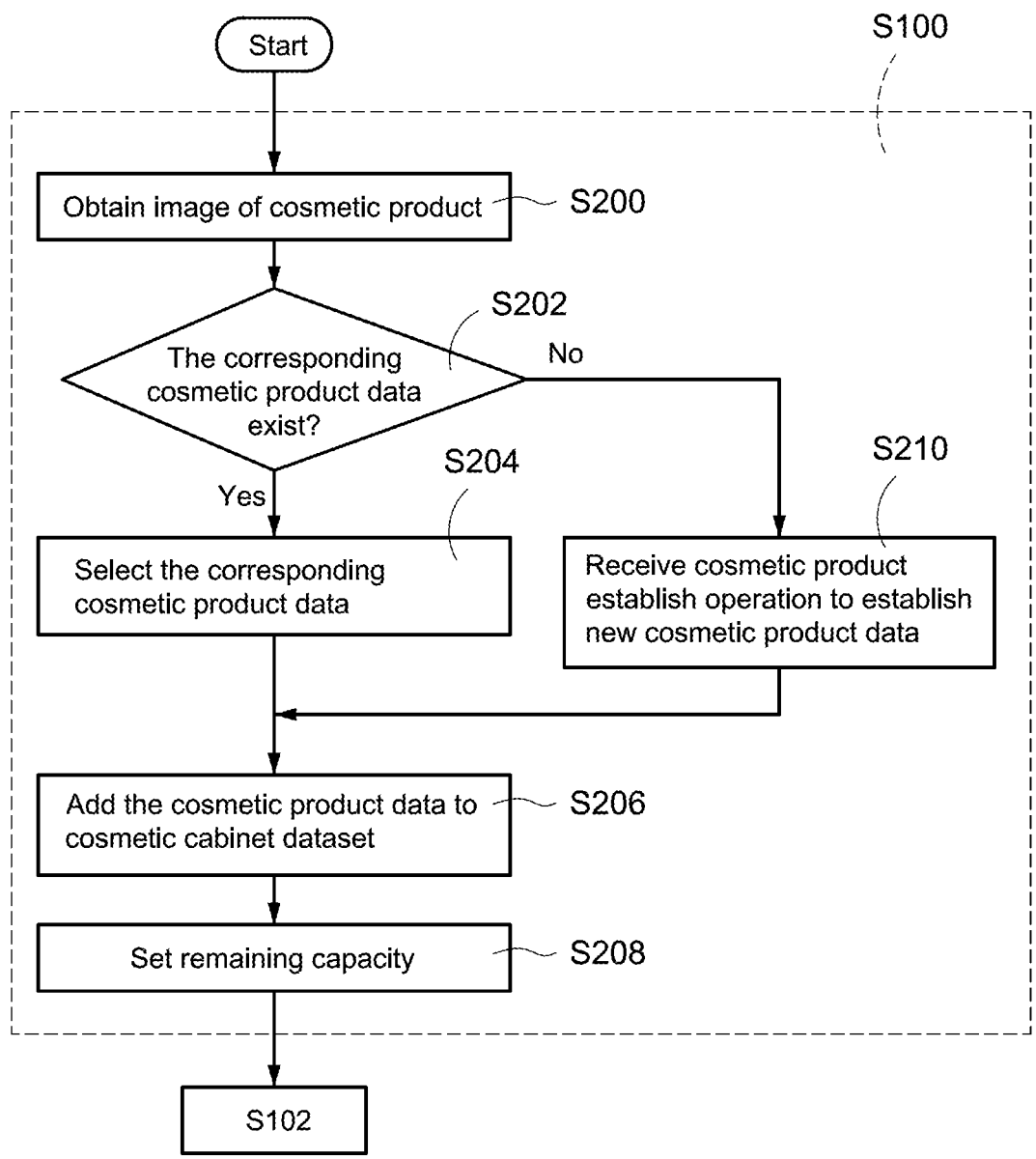
FIG. 4 is a partial flowchart of the method of estimating the remaining capacity of the cosmetic product according to the second embodiment of the present disclosure.

The present disclosure automatically estimate the remaining capacity of the cosmetic product based on the usage record of the body information analysis apparatus 10 used by user and send reminder message before the exhaustion of the cosmetic product. Therefore, the cosmetic plan of user can be prevented from interrupt due to exhaustion. The present disclosure automatically modifies the estimated remaining capacity of cosmetic product based on the feedback data by the control module 100, thus have more precise estimation for the remaining capacity of cosmetic product With reference now to FIGS. 3 and 4, FIG. 4 is a partial flowchart of the method of estimating the remaining capacity of the cosmetic product according to the second embodiment of the present disclosure. In comparison with the embodiment in FIG. 3, the embodiment in FIG. 4 further provides image registration function to allow the user to fast register the cosmetic product owned by the user through inputting image. More particularly, in this embodiment, the input module 104 further comprises image fetching unit 20, and the step S100 of the method of estimating the remaining capacity of the cosmetic product according to the second embodiment has following steps.

Step S200: the control module 100 receives user's cosmetic product configuration operation sent through the configuring module 300. More particularly, the cosmetic product configuration operation in this embodiment is implemented by user operating the image fetching unit 20 to take the image of the cosmetic product to be configured.

Step S202: the control module 100 determines whether the cosmetic product data corresponding to the taken image exists in the database 1060 (or the network database 16) by using the searching module 308 to search the database 1060 (or the network database 16).

The control module 100 determines the search to be successful if the cosmetic product data corresponding to the taken image exists in the database 1060 (or the network database 16). Otherwise, the control module 100 determines the search to be failure and then executes step S210.

Step S204: the control module 100 selects the cosmetic product data corresponding to the taken image by using the searching module 308.

In one embodiment, the database 1060 (or the network database 16) stores a plurality of cosmetic product data and a plurality of sample appearances corresponding to cosmetic product of different product numbers. Moreover, the cosmetic product configuration operation is conducted by taking the image (photo) for the cosmetic product. The control module 100 searches, in the database 1060 (or the network database 16), for the sample image matched with the image of the cosmetic product and selects the cosmetic product data corresponding to the sample image if the sample image is matched with the image of the cosmetic product.

In one embodiment, the database 1060 (or the network database 16) stores a plurality of identification data (such as the product name, product number or trademark shown on product appearance or barcode of the cosmetic product) for the cosmetic products.

The control module 100 performs optical character recognition (OCR) for the taken image (if the taken image is the product appearance) or performs barcode recognition (if the taken image is the barcode of the cosmetic product) to obtain a set of input data (such as the product name, product number or trademark shown on product appearance or barcode of the cosmetic product). Afterward, the control module 100 searches, in the database 1060 (or the network database 16), for the identification data matched with the input data and selects the cosmetic product data corresponding to the identification data matched with the input data.

Step S206: the control module 100 identifies the current user by using the configuring module 300 and adds the selected cosmetic product data into the cosmetic cabinet dataset of the identified user.

Step S208: the control module 100 configures the remaining capacity for the added (selected) cosmetic product data by using the configuring module 300. In one embodiment, the control module 100 obtains, through the database 1060 (or the network database 16), the initial capacity of the cosmetic product and sets the obtained initial capacity as the remaining capacity of the added (selected) cosmetic product data.

In step S202, if the control module 100 determines the search to be failed, then the control module 100 executes step S210: the control module 100 receives the cosmetic product establish operation through the input module 104 and using the manual configuration module 310, thus establish new cosmetic product data.

Due to the great variety of cosmetic product, the database 1060 (or the network database 16) may not have built with the cosmetic product data of the specific cosmetic product owned by the user. The present disclosure enables the user to perform cosmetic product establish operation when search is failed, thus overcome above mentioned problem and enhance user experience.

In another embodiment, the user may directly input the cosmetic product establish operation instead of waiting until the control module 100 determines the search to be failed.

In another embodiment, the body information analysis apparatus 10 may periodically conduct search through the network 12 to fetch new cosmetic product information and establish corresponding cosmetic product data. Therefore, the possibility of search failure can be reduced and user will have less chance to conduct cosmetic product establish operation.

Figure 5:
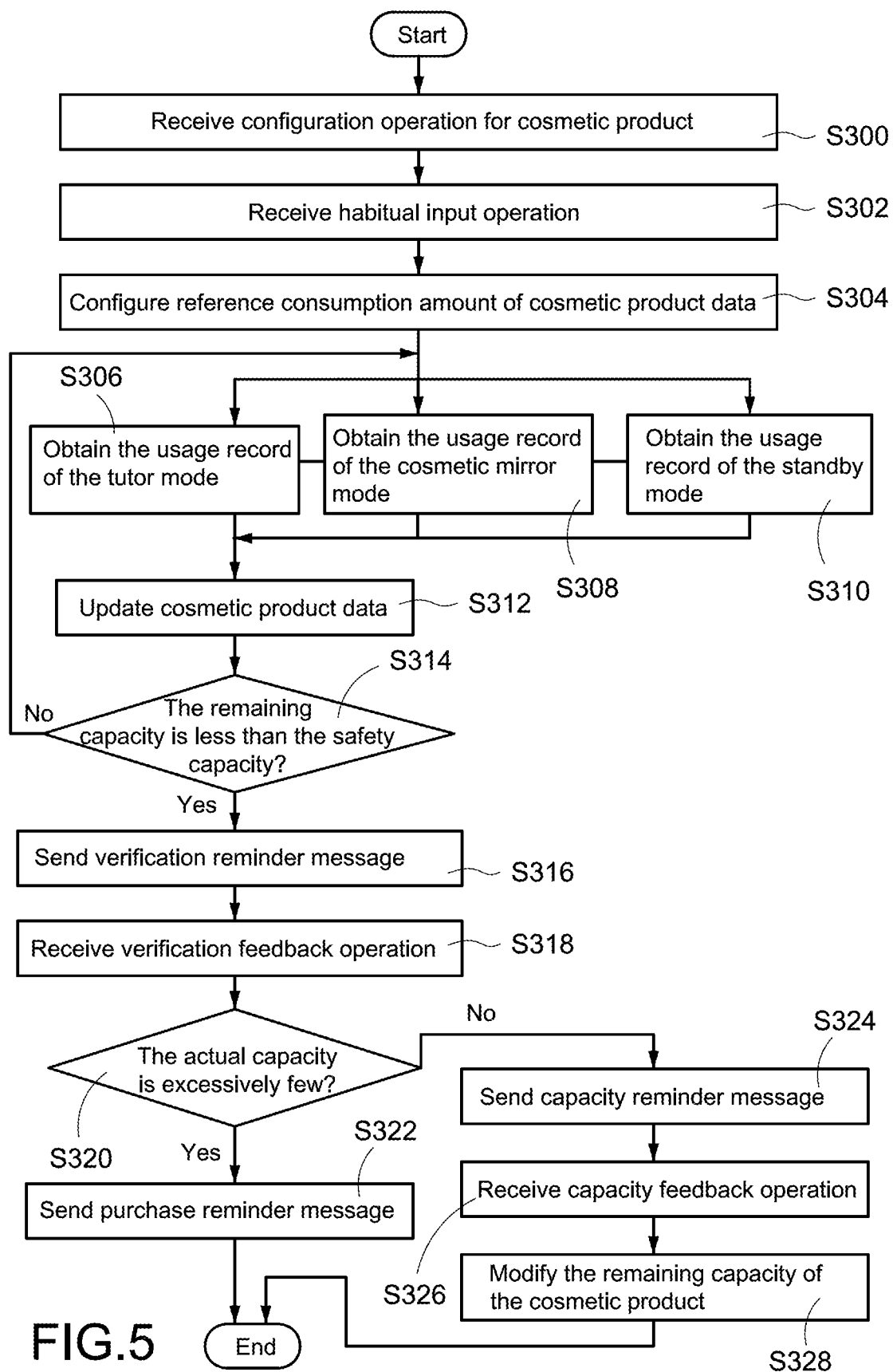
FIG. 5 is a flowchart of the method of estimating the remaining capacity of the cosmetic product according to the third embodiment of the present disclosure.

With reference now to FIG. 5, FIG. 5 is a flowchart of the method of estimating the remaining capacity of the cosmetic product according to the third embodiment of the present disclosure. In the embodiment shown in FIG. 5, the body information analysis apparatus 10 is electronic mirror and can be switched among tutor mode, cosmetic mirror mode and standby mode.

In the tutor mode, the control module 100 controls, through the tutor mode execution module 312 and the display module 102, to play back the cosmetic related tutor content (such as tutor text, tutor audio or tutor video) such that the user may follow the tutor content to conduct cosmetic operation such as skin care or make up, namely, using the cosmetic product owned by the user.

In the cosmetic mirror mode, the control module 100 controls, through the cosmetic mirror mode execution module 314 and the display module 102, to turn off a part of or the whole of the display module 102 to enable a part of or the whole of reflection mirror. Therefore, the user may use the body information analysis apparatus 10 as cosmetic mirror.

In the standby mode, the control module 100 controls, through the standby mode execution module 316, the body information analysis apparatus 10 for power saving and the control module 100 may control the body information analysis apparatus 10 to enter the tutor mode or the cosmetic mirror mode according to user input operation.

The method of estimating the remaining capacity of the cosmetic product according to this embodiment comprises following steps.

Step S300: the control module 100 receives configuration operation for cosmetic product from user and through the configuration module 300 and the input module 104. The control module 100 sets up (configures) one or more cosmetic product data based on the received configuration operation for cosmetic product.

Step S302: the control module 100 receives habitual input operation through the input module 104 and the reference consumption amount setting module 318 thereof, and configures the habitual timing data, the habitual usage frequency and/or habitual single usage amount for the cosmetic product data.

More particularly, the user may input the habitual usage for the cosmetic product thereof one by one (the habitual usage is for example, the habitual timing, the usage counts per week and/or the usage amount for each time). Afterward, the control module 100 configures the corresponding data (such as habitual usage timing, the habitual usage frequency and/or habitual single usage amount) and adds the corresponding data to the cosmetic product data for the cosmetic product.

Step S304: the control module 100 configures, through the reference consumption amount setting module 318, the reference consumption amount in the cosmetic product data based on habitual single usage amount.

In one embodiment, the control module 100 directly configures the habitual single usage amount as the reference consumption amount in the cosmetic product data.

In one embodiment, the control module 100 performs weighting operation to the habitual single usage amount, the suggested usage amount and history usage amount and sets the weighting operation result as the reference consumption amount in the cosmetic product data. The control module 100 may build the suggested usage amount/the history usage amount in the database 1060 or search the suggested usage amount/the history usage amount through the network 12.

Step S306: the control module 100 reads the usage record of the tutor mode from the memory module 106 and through the updating module 302. More particularly, the control module 100 automatically records the usage record for each time the body information analysis apparatus 10 enter into or exits from the tutor mode (for example, the control module 100 records the accumulation tutor counts or accumulation tutor time in the tutor mode).

Step S308: the control module 100 reads the usage record of the cosmetic mirror mode from the memory module 106 and through the updating module 302. More particularly, the control module 100 automatically records the usage record for each time the body information analysis apparatus 10 enter into or exits from the cosmetic mirror mode (for example, the control module 100 records the accumulation tutor counts or accumulation tutor time in the cosmetic mirror mode).

Step S310: the control module 100 automatically records the usage record for each time the body information analysis apparatus 10 enter into or exits from the standby mode, where in standby mode the user does not use the body information analysis apparatus 10. For example, the control module 100 records the time duration each time the body information analysis apparatus 10 is in standby mode, namely, the continual standby time of the body information analysis apparatus 10.

Step S312: the control module 100 updates each cosmetic product data in the cosmetic cabinet dataset for the current user through the updating module 302 and based on the usage record (for example, the obtained usage record for tutor mode, the usage record for cosmetic mirror mode, and usage record for standby mode) of the body information analysis apparatus 10.

In one embodiment, the control module 100 updates the remaining capacity in each cosmetic product data.

In one embodiment, the control module 100 updates the remaining capacity in each cosmetic product data based on the usage record of the body information analysis apparatus 10, the reference consumption amount and the habitual usage frequency.

In one embodiment, the control module 100 updates the remaining capacity in each cosmetic product data based on the usage record of the tutor mode (such as tutor accumulation counts) and the tutor reference consumption amount of each cosmetic product data (such as the consumption amount suggested by the tutor content during the playback in the tutor mode).

More particularly, the control module 100 only updates the remaining capacity in each cosmetic product data corresponding to the tutor content played back in the tutor mode, which will be detailed later.

For example, the user has six cosmetic products A-F, and the body information analysis apparatus 10 stores three tutor content data, where the first tutor content data guides the user for cosmetic products A-C, the second tutor content data guides the user for cosmetic products C-E and the third tutor content data guides the user for cosmetic product F, When user operates the body information analysis apparatus 10 to play back the first tutor content data, the body information analysis apparatus 10 only updates the remaining capacity for cosmetic products A-C instead of the remaining capacity for cosmetic products D-F. When user operates the body information analysis apparatus 10 to play back the second tutor content data, the body information analysis apparatus 10 only updates the remaining capacity for cosmetic products C-E instead of the remaining capacity for cosmetic products A, B and F, and so on.

In one embodiment, the control module 100 obtains the suggested usage amount for each cosmetic product data (such as the suggested usage amount proposed by the manufacturer) and updates the remaining capacity for each cosmetic product data based on the usage record of the body information analysis apparatus 10 and the obtained suggested usage amount for each cosmetic product data.

In one embodiment, the control module 100 updates the remaining capacity for each cosmetic product data based on the usage record of the body information analysis apparatus 10 in cosmetic mirror mode (such as the accumulation cosmetic counts or accumulation cosmetic time) and the cosmetic reference consumption amount (for example the default cosmetic reference consumption amount preset by user) for each cosmetic product data.

In one embodiment, the cosmetic reference consumption amount may be less than the tutor reference consumption amount, while cosmetic reference consumption amount may also be larger than or equal to the tutor reference consumption amount. For example, when the user uses the habitual cosmetic process or has time constrain for cosmetic process (for example, just before going out), the user may select the cosmetic mirror mode of the body information analysis apparatus 10 (namely, the user does not need to follow the tutor mode). The consumption amount of the consumption amount is less due to the familiarity with the cosmetic process and limited time constrain.

More particularly, the user may set a plurality usage conditions based usage requirement and then set the combination of cosmetic product data corresponding to the usage condition. The control module 100 updates the remaining capacity for the corresponding cosmetic product data when a specific usage condition is met.

For example, the user has six cosmetic products A-F, and sets three usage condition: the first usage condition is for weekday morning and corresponding to the combination of cosmetic products A, B; the second usage condition is for weekday night and corresponding to the combination of cosmetic products C, D; the third usage condition is for weekend and corresponding to the combination of cosmetic products C-F.

In weekday morning, the control module 100 only updates the remaining capacity for the cosmetic products A, B instead of cosmetic products C-F when it finishes the cosmetic mirror mode. In weekday night, the control module 100 only updates the remaining capacity for the cosmetic products C, D instead of cosmetic products A-B, E-F when it finishes the cosmetic mirror mode and so on.

The present disclosure sets the cosmetic reference consumption amount to be less than the tutor reference consumption amount to comply with the actual consumption of cosmetic product and enhance the estimation preciseness of remaining capacity.

In one embodiment, the cosmetic reference consumption amount may be more than or equal to the tutor reference consumption amount. More particularly, when the user uses the non-habitual cosmetic process or has abundant time for cosmetic process (for example, before sleep), the user may select the tutor mode of the body information analysis apparatus 10 (namely, the user needs to follow the tutor mode). In this situation, the consumption amount is more than or equal to the tutor reference consumption amount due to the non-familiarity with the cosmetic process or more cosmetic time.

In one embodiment, the control module 100 may updates the remaining capacity for each cosmetic product data based on the usage record of standby mode and the default consumption amount (such as the consumption amount suggested by the manufacture or the consumption amount set by user). More particularly, the control module 100 automatically performs above updating when the control module 100 determines that the continual standby time of the body information analysis apparatus 10 reaches the default standby time (for example 3 days). By above scheme, the present disclosure timely updates the remaining capacity of the cosmetic product when the user does not use the body information analysis apparatus 10 for a long time and use the cosmetic product by herself, thus reducing the difference between the remaining capacity and the actual capacity of the cosmetic product.

Step S314: the control module 100 determines through the monitoring module 304 whether the remaining capacity of the updated cosmetic product data is less than the safety capacity of the cosmetic product data.

If the control module 100 determines that the remaining capacity of the updated cosmetic product data is less than the safety capacity of the cosmetic product data, the control module 100 executes the step S316. Otherwise, the control module 100 re-executes step S306, S308 and S310.

Step S316: the control module 100 uses the monitoring module 304 to send verification reminder message through the display module 102 and reminds the user to perform the verification feedback operation. More particularly, the verification feedback operation instructs the user to answer "whether the actual capacity of a specific cosmetic product is excessively few".

Step S318: the control module 100 receives, through the verification module 3060, the verification feedback operation and configures the verification feedback data based on the verification feedback operation, where the verification feedback data is an indication (such as "Yes" or "No") to indicate whether the actual capacity of the cosmetic product is excessively few.

Step S320: the control module 100 determines, through the verification module 3060, whether the actual capacity of the cosmetic product is excessively few based on the verification feedback data.

If the control module 100 determines that the actual capacity of the cosmetic product is excessively few (for example, the verification feedback data is "Yes"), then the step S322 is executed. If the control module 100 determines that the actual capacity of the cosmetic product is sufficient (for example, the verification feedback data is "No"), then the control module 100 executes the step S324 to further modify the remaining capacity.

Step S322: the control module 100 determines that the actual capacity of the cosmetic product is excessively few and sends, through the display module 102, purchase reminder message to remind user to purchase backup cosmetic product.

In one embodiment, the reminder message may include the product number, appearance image, product name, suggested price, purchase channel or purchase website for the cosmetic product which is excessively few.

In one embodiment, the control module 100 may perform comparison for the cosmetic product which is excessively few in various shopping websites through the network module 108 and network 12 and process the comparison result. Afterward, the control module 100 displays the comparison result (such as the highest-ranking store, the store with lowest price, the store closest to user and the store with overall highest ranking) on the display module 102.

Step S324: the control module 100 sends the capacity reminder message through the capacity feedback module 3062 and the display module 102 to instruct the user to perform the capacity feedback operation.

Step S326: the control module 100 receives capacity feedback operation through the capacity feedback module 3062 and the input module 104, and configures the corresponding capacity feedback data (such as "very sufficient", "sufficient", "almost exhausted", "already exhausted", "half capacity remain" or "quarter capacity remain") based on the capacity feedback operation. More particularly, the capacity reminder message is a question to inquire user about the "actual capacity for a specific cosmetic product".

Step S328: the control module 100 modifies the remaining capacity for the cosmetic product, which is misjudged to be with excessively little capacity through the capacity feedback module 3062 and based on the capacity feedback data.

In one embodiment, the different capacity feedback data are set to be corresponding to different modification remaining capacity in advance. For example, the capacity feedback data of "very sufficient" means the actual capacity to be 50%, the capacity feedback data of "sufficient" means the actual capacity to be 30%. Moreover, the control module 100 modifies the remaining capacity based on the modification remaining capacity corresponding to the capacity feedback data. For example, the modification remaining capacity may directly replace the remaining capacity, or is subjected to an averaging operation and then used as the remaining capacity.

In one embodiment, the control module 100 may determine, through the error calculation module 3064, the modification remaining capacity for the cosmetic product which is misjudged to be with excessively few capacity based on the capacity feedback data, calculate the capacity error between the modification remaining capacity and the current remaining capacity, and then modify the reference consumption amount based on the capacity error.

Through the modification based on the capacity feedback data, the present disclosure can more precisely estimate the remaining capacity of the cosmetic product and timely send reminder to user before the cosmetic product is exhausted, thus prevent the interrupt of cosmetic plan due to exhaustion of the cosmetic product.

Figure 6:
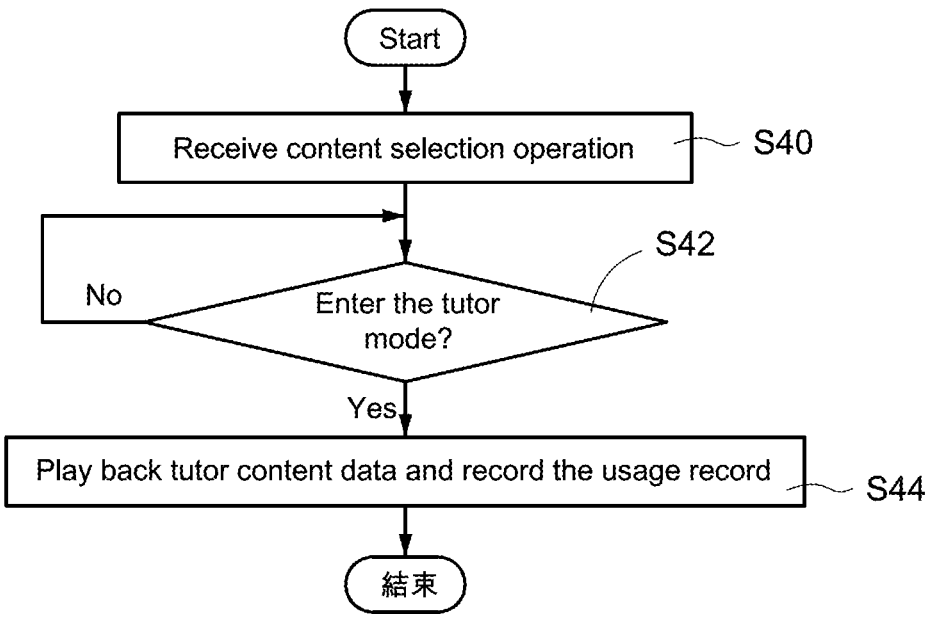
FIG. 6 shows the flowchart of the tutor mode according to the fourth embodiment of the present disclosure.

FIG. 6 shows the flowchart of the tutor mode according to the fourth embodiment of the present disclosure. It should be noted that the steps S40-S44 in FIG. 6 may be parallel or sequentially executed with steps S100-S110 in FIG. 3, or parallel or sequentially executed with steps S300-S326 in FIG. 5. The tutor mode according to this embodiment includes following steps.

Step S40: the control module 100 receives, through the tutor mode execution module 312 and the input module 104, a content selection operation for selecting one of the tutor content data.

In one embodiment, the tutor content data is stored in the memory module 106 in advance and corresponding to different cosmetic purposes (such as whitening, moisturizing, repairing, making-up for specific face, making-up for skin color, or making-up for specific facial part), and corresponding to the combination of various cosmetic product data.

Therefore, user may select suitable tutor content data based on her cosmetic purpose.

Step S42: the control module 100 determines, through the tutor mode execution module 312, whether the body information analysis apparatus 10 enters the tutor mode.

The control module 100 executes the step S44 if the control module 100 determines that the body information analysis apparatus 10 enters the tutor mode (for example, the user presses key for entering tutor mode or inputs specific voice for entering tutor mode). Otherwise, the control module 100 re-executes the step S42.

Step S44: when the body information analysis apparatus 10 enters the tutor mode, the control module 100 plays, through the tutor mode execution module 312, the tutor content data selected by user in the step S40 and the usage record of the tutor mode is recorded (for example, the tutor accumulation count for entering the tutor mode or the tutor accumulation time is recorded). The control module 100 controls the body information analysis apparatus 10 to exit from the tutor mode when the playback of the selected tutor content data is finished.

Therefore, the user can use the tutor mode of the present disclosure to learn cosmetic process when she is not familiar with the cosmetic process, thus enhance cosmetic skill and effect. Moreover, the present disclosure updates the remaining capacity of the corresponding cosmetic product based on the tutor content data selected by user, thus precisely estimate the remaining capacity of each cosmetic product.

Figure 7:
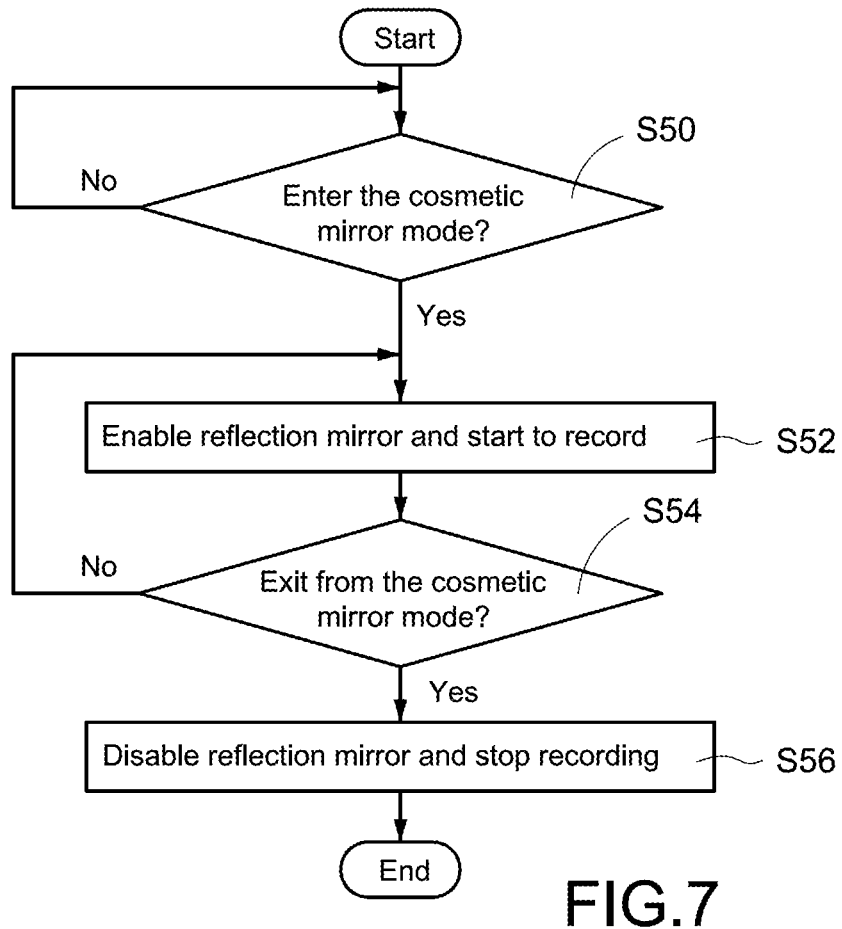
FIG. 7 shows the flowchart of the cosmetic mirror mode according to the fifth embodiment of the present disclosure.

FIG. 7 shows the flowchart of the cosmetic mirror mode according to the fifth embodiment of the present disclosure. It should be noted that the steps S50-S56 in FIG. 7 may be parallel or sequentially executed with steps S100-S110 in FIG. 3, or parallel or sequentially executed with steps S300-S326 in FIG. 5. The cosmetic mirror mode according to this embodiment includes following steps.

Step S50: the control module 100 determines, through the cosmetic mirror mode execution module 314, whether the body information analysis apparatus 10 enters the cosmetic mirror mode.

The control module 100 executes the step S52 if the control module 100 determines that the body information analysis apparatus 10 enters the cosmetic mirror mode (for example, the user presses key for entering cosmetic mirror mode or inputs specific voice for entering cosmetic mirror mode). Otherwise, the control module 100 re-executes the step S50.

Step S52: the control module 100 turns off, through the cosmetic mirror mode execution module 314, the whole or a part of the display module 102 to enable the whole or a part of the reflection mirror (namely the user image can be reflected and viewed) such that the user may use the body information analysis apparatus 10 as cosmetic mirror. Moreover, the control module 100 may start to record the usage record of the cosmetic mirror mode such as updating cosmetic accumulation counts or starting to count stay time in the cosmetic mirror mode for this time.

Step S54: the control module 100 determines, through the cosmetic mirror mode execution module 314, whether the body information analysis apparatus 10 exits from the cosmetic mirror mode.

The control module 100 executes the step S56 if the control module 100 determines that the body information analysis apparatus 10 exits from the cosmetic mirror mode (for example, the user presses key for exiting from cosmetic mirror mode or inputs specific voice for exiting from cosmetic mirror mode). Otherwise, the control module 100 re-executes the step S52 to continually enable the reflection mirror and record the usage record for the cosmetic mirror mode.

Step S56: the control module 100 turns on, through the cosmetic mirror mode execution module 314, the whole or a part of the display module 102 to disable the whole or a part of the reflection mirror (namely the user image will not be reflected and viewed) such that the user may use the body information analysis apparatus 10 as display. Moreover, the control module 100 may stop recording the usage record of the cosmetic mirror mode.

In one embodiment, the control module 100 stops counting the stay time in the cosmetic mirror mode to calculate the single usage time and updates the cosmetic accumulation time based on the calculated single usage time.

In one embodiment, the control module 100 may not disable the reflection mirror (namely the body information analysis apparatus 10 still reflects user image) and only stop counting the cosmetic accumulation time.

Therefore, the user may use the cosmetic mirror mode to fast finish the cosmetic process and reduce cosmetic elapsed time when user is familiar with the cosmetic process or has less time for cosmetic process.

Figure 8:
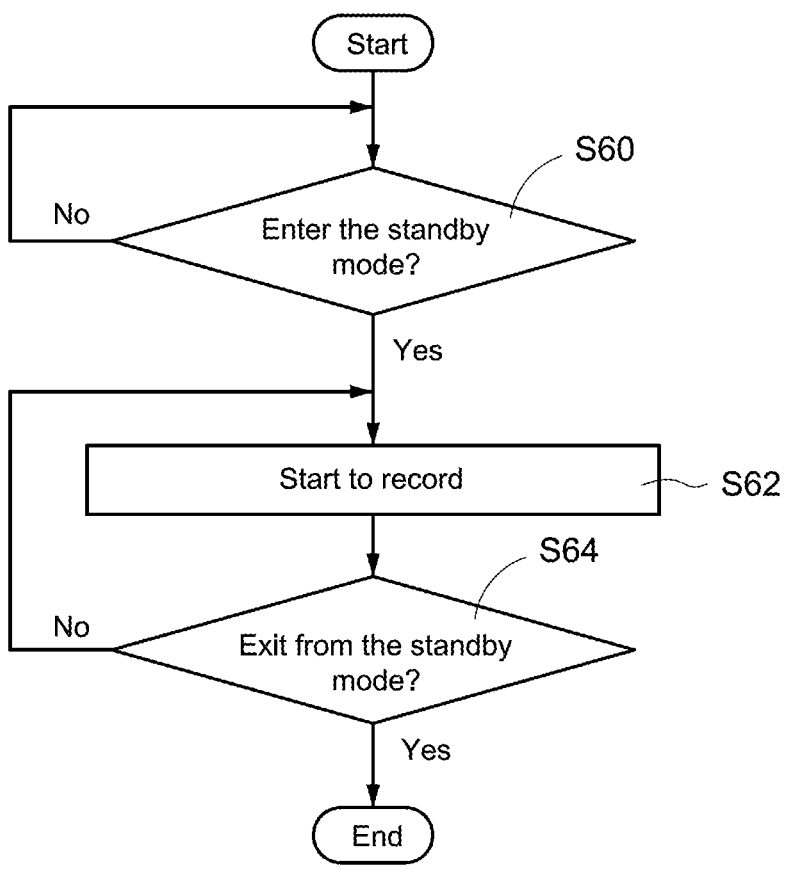
FIG. 8 shows the flowchart of the standby mode according to the fourth embodiment of the present disclosure.

FIG. 8 shows the flowchart of the standby mode according to the fourth embodiment of the present disclosure. It should be noted that the steps S60-S62 in FIG. 8 may be parallel or sequentially executed with steps S100-S110 in FIG. 3, or parallel or sequentially executed with steps S300-S326 in FIG. 5. The standby mode according to this embodiment includes following steps.

Step S60: the control module 100 determines, through the standby mode execution module 316, whether the body information analysis apparatus 10 enters the standby mode (for example, the user stops inputting any operation for a predetermined duration).

In one embodiment, the control module 100 may control the body information analysis apparatus 10 for power saving in standby mode, and may control the body information analysis apparatus 10 to enter tutor mode or cosmetic mirror mode at any time by user operation.

The control module 100 executes step S62 when the control module 100 determines that the body information analysis apparatus 10 enters the standby mode. Otherwise, the control module 100 re-executes the step S60.

Step S62: in standby mode the control module 100 records, through the standby mode execution module 316, the usage record for standby mode (such as the accumulation count for standby mode, the accumulation standby time or the single standby time).

In one embodiment, the control module 100 counts the continual standby time of the body information analysis apparatus 10 in this standby mode operation (namely the continual unused time for the body information analysis apparatus 10) and adds the continual standby time into the usage record.

Step S64: the control module 100 determines, through the standby mode execution module 316, whether the body information analysis apparatus 10 exits from the standby mode (for example, the body information analysis apparatus 10 receives user operation).

The standby mode is ended when the control module 100 determines that the body information analysis apparatus 10 exits from the standby mode. Otherwise, the control module 100 re-executes step S62.

Therefore, the power consumption of the body information analysis apparatus 10 can be effectively saved by the standby mode of the present disclosure.

Thus, particular embodiments have been described. Other embodiments are within the scope of the following claims. For example, the actions recited in the claims may be performed in a different order and still achieve desirable results.

What is claimed is:

1. A method of estimating remaining capacity of cosmetic product, the method comprising:
   a) using a body information analysis apparatus to receive a cosmetic product configuration operation to configure a plurality of cosmetic product data and configure a remaining capacity for each of the cosmetic product data, wherein each of the cosmetic product data is corresponding to a cosmetic product;
   b) receiving a habitual input operation to configure a habitual usage frequency and a habitual single usage amount for one of the cosmetic product data;
   c) configuring a reference consumption amount of the cosmetic product data based on the habitual single usage amount;
   d) adjusting the remaining capacity for each of the cosmetic product data based on a usage record of the body information analysis apparatus and the reference consumption amount and the habitual usage frequency of the cosmetic product data, wherein the usage record comprises time or counts of the body information analysis apparatus entering a non-standby mode or time or counts of the body information analysis apparatus entering a standby mode;
   e) sending a reminder message when the remaining capacity of any of the cosmetic product data is less than a safety capacity;
   f) receiving a verification feedback operation after sending the reminder message, configuring a verification feedback data based on the verification feedback operation, wherein the verification feedback data indicates whether an actual capacity a corresponding cosmetic product is excessively few;
   g) receiving a capacity feedback operation when the verification feedback data indicates that the actual capacity corresponding to the cosmetic product is excessively few, and configuring capacity feedback data based on the capacity feedback operation, wherein the capacity feedback data indicates the actual capacity of the corresponding cosmetic product; and
   h) modifying the remaining capacity of the cosmetic product data based on the capacity feedback data for the cosmetic product.

2. The method in claim 1, wherein the step a) further comprises:
   a1) photo-taking an image of any of the cosmetic product by an image fetching unit of the body information analysis apparatus;
   a2) searching for the cosmetic product data corresponding to the image in a database;
   a3) receiving a cosmetic product establish operation to establish new cosmetic product data when search fails;
   a4) adding the searched cosmetic product data into a cosmetic cabinet dataset of a user;
   a5) obtaining an initial capacity for the cosmetic product data and configuring the initial capacity as the remaining capacity of the cosmetic product data.

3. The method in claim 2, wherein the database stores a plurality of sample images corresponding to the cosmetic product data, the image is an appearance image of the cosmetic product, wherein in step a2) the cosmetic product data with sample image matched with the appearance image is searched for.

4. The method in claim 2, wherein the database stores a plurality of identification data corresponding to the cosmetic product data, the image is a barcode image of the cosmetic product, wherein in step a2) the image is analyzed to obtain an input data, the cosmetic product data with identification data matched with the input data is searched for, wherein the input data is a barcode data for the cosmetic product.

5. The method in claim 1, wherein the step d) comprises:
   d1) receiving a content selection operation for selecting one of tutor content data, wherein the tutor content data is corresponding to the combination of various cosmetic product data;
   d2) playing back a selected tutor content data when the method enters a tutor mode;
   d3) adjusting the remaining capacity of the cosmetic product data based on a tutor reference consumption amount and a tutor accumulation count for the body information analysis apparatus entering the tutor mode or a tutor accumulation time for the body information analysis apparatus entering the tutor mode, wherein the body information analysis apparatus obtains a suggested consumption amount corresponding to each of the cosmetic product data in the playbacked tutor content data and adjusts the remaining capacity in each of the cosmetic product data in the playbacked tutor content data based on the obtained suggested consumption amount for each of the cosmetic product data;

d4) updating a cosmetic accumulation count and starting to counting time when the body information analysis apparatus enters a cosmetic mirror mode;

d5) stopping to count time and obtain a single usage time when the body information analysis apparatus exits the cosmetic mirror mode; updating a cosmetic accumulation time based on the single usage time;

d6) adjusting the remaining capacity of the cosmetic product data based on a cosmetic reference consumption amount and a cosmetic accumulation count for the body information analysis apparatus entering the cosmetic mirror mode or a cosmetic accumulation time for the body information analysis apparatus entering the cosmetic mirror mode, wherein the cosmetic reference consumption amount is less than the tutor reference consumption amount;

d7) adjusting the remaining capacity in each of the cosmetic product data based on a default consumption amount of each cosmetic product data when a continual standby time of the body information analysis apparatus reaches a default standby time.

6. The method in claim 1, further comprising a step i) after the step g) and before the step h): calculating a capacity error based on the capacity feedback data and the remaining capacity of the cosmetic product data; wherein the step h) the remaining capacity of the cosmetic product is modified based on the capacity feedback data of the cosmetic product, and the reference consumption amount is modified based on the capacity error.

7. A body information analysis apparatus, comprising:
a display module configured to display a reminder message;
an input module configured to receive a cosmetic product configuration operation and to receive a feedback operation when the reminder message is displayed;
a memory module configured to store a plurality of cosmetic product data, a safety capacity, a remaining capacity and a reference consumption amount for each of the cosmetic product data, and configured to store a usage record of the body information analysis apparatus, wherein each of the cosmetic product data is corresponding to a cosmetic product, the usage record comprises time or counts of the body information analysis apparatus entering a non-standby mode or time or counts of the body information analysis apparatus entering a standby mode; and
a control module electrically connected to the display module, the input module and the memory module and comprising:
a configuring module configured to set up a plurality of cosmetic product data based on the cosmetic product configuration operation and set up the remaining capacity of the cosmetic product data;
a reference consumption amount setting module configured to receive a habitual input operation through the input module, to set up a habitual usage frequency and a habitual single usage amount for one of the cosmetic product data based on the habitual input operation, and to set up the reference consumption amount in the cosmetic product data as the habitual single usage amount;
an updating module configured to adjust the remaining capacity of the cosmetic product data based on usage record and the reference consumption amount and the habitual usage frequency of each cosmetic product data;
a monitoring module configured to send the reminder message through the display module when determining that the remaining capacity of any of the cosmetic product data is less than the safety capacity; and
a feedback module comprising:
a verification module configured to receives a verification feedback operation through the input module after the reminder message is sent, and to set up a capacity feedback data based on the capacity feedback operation, wherein the verification feedback data indicates whether an actual capacity of a corresponding cosmetic product is excessively few; and
a capacity feedback module configured to receive a capacity feedback operation through the input module when the verification feedback data indicates excessively little actual capacity, to set up a capacity feedback data based on the capacity feedback operation, wherein the capacity feedback data indicates the actual capacity of the corresponding cosmetic product;
wherein the feedback module modifies the remaining capacity of the cosmetic product data based on the capacity feedback data.

8. The body information analysis apparatus in claim 7, wherein the body information analysis apparatus further comprises an image fetching unit electrically connected to the control module and configured to take an image of any of the cosmetic product, the memory module is further configured to store a cosmetic cabinet dataset comprising cosmetic product data of a plurality of cosmetic products owned by a user, the memory module further comprises a database configured to store a plurality of cosmetic product data corresponding to a plurality of images;
the control module further comprising:
a searching module configured to search the cosmetic product data corresponding to the image of the photo-taken cosmetic product in the database; and
a manual configuration module configured to receive a cosmetic product establish operation through the input module when the searching module fails in searching and sets up a new cosmetic product data based on the cosmetic product establish operation;
wherein the configuring module is configured to add the cosmetic product data into the cosmetic cabinet dataset and set an initial capacity of the cosmetic product data as the remaining capacity of the cosmetic product data.

9. The body information analysis apparatus in claim 8, wherein the database is configured to store a plurality of identification data for the plurality of cosmetic product data, the image fetching unit is configured to take an barcode image for the cosmetic product, the searching module is configured to analyze the barcode image to obtain an input data and search for the cosmetic product data with the identification data matched with the input data, wherein the input data is a barcode data for the cosmetic product.

10. The body information analysis apparatus in claim 7, wherein the memory module is configured to store a plurality of tutor content data, a tutor reference consumption amount, a suggested consumption amount, a cosmetic reference consumption amount and a default consumption amount for each of the cosmetic product data, a tutor accumulation count or a tutor accumulation time for the body information analysis apparatus entering a tutor mode, a cosmetic accumulation count or a cosmetic accumulation time for the body information analysis apparatus entering a cosmetic mirror mode, and a default standby time, wherein each of the tutor content data is corresponding to corresponding to a combination of various cosmetic product data, wherein the cosmetic reference consumption amount is less than the tutor reference consumption amount;

the control module further comprises:
   a tutor mode execution module configured to receive a content selection operation for one of the plurality of tutor content data through the input module and playback a selected tutor content data by the display module after the body information analysis apparatus enters tutor mode; the tutor mode execution module configured to adjust the remaining capacity in each of the cosmetic product data based on the tutor accumulation count or the tutor accumulation time with the tutor reference consumption amount for each cosmetic product data, wherein the tutor mode execution module is configured to adjust the remaining capacity in each of the cosmetic product data based on the suggested consumption amount in the cosmetic product data of playbacked tutor content data;
   a cosmetic mirror mode execution module configured to update the cosmetic accumulation count and then start time counting after the body information analysis apparatus enters cosmetic mirror mode, configured to stop time counting when the body information analysis apparatus exits cosmetic mirror mode and then obtain a single usage time, the cosmetic mirror mode execution module configured to update the cosmetic accumulation time based on the single usage time, the cosmetic mirror mode execution module configured to adjust the remaining capacity in each of the cosmetic product data based on the cosmetic reference consumption amount and the cosmetic accumulation count or the cosmetic accumulation time; and
   a standby mode execution module configured to adjust the remaining capacity in each of the cosmetic product data based on default consumption amount of each cosmetic product data when a continual standby time of the body information analysis apparatus reaches the default standby time.

11. The body information analysis apparatus in claim 7, wherein the feedback module further comprises:
   an error calculation module configured to calculate a capacity error based on the capacity feedback data and the remaining capacity of the cosmetic product data, to modify the remaining capacity of the cosmetic product based on the capacity feedback data of the cosmetic product, and to modify the reference consumption amount based on the capacity error.

* * * * *